(12) United States Patent
McLoughlin et al.

(10) Patent No.: US 7,849,871 B2
(45) Date of Patent: Dec. 14, 2010

(54) METHOD AND APPARATUS FOR CONTROLLING A FLUID SYSTEM

(75) Inventors: John E. McLoughlin, Lake Grove, NY (US); Neocles G. Athanasiades, Setauket, NY (US); Toh K. Meng, Hauppauge, NY (US)

(73) Assignee: JNT Link, LLC, Nesconset, NY (US)

( * ) Notice: Subject to any disclaimer, the term of this patent is extended or adjusted under 35 U.S.C. 154(b) by 1169 days.

(21) Appl. No.: 11/340,538

(22) Filed: Jan. 27, 2006

(65) Prior Publication Data

US 2007/0175513 A1    Aug. 2, 2007

(51) Int. Cl.
*G05D 11/00* (2006.01)
*A62C 35/68* (2006.01)

(52) U.S. Cl. .................... 137/87.02; 137/386; 137/392; 169/13

(58) Field of Classification Search .............. 137/87.02, 137/118.01, 118.06, 118.07, 386, 558, 392, 137/423, 428; 169/13; 417/36
See application file for complete search history.

(56) References Cited

U.S. PATENT DOCUMENTS

| | | | | |
|---|---|---|---|---|
| 2,260,312 A | * | 10/1941 | Gruman | 417/36 |
| 2,799,352 A | * | 7/1957 | Boerner et al. | 169/14 |
| 2,815,036 A | * | 12/1957 | De Matteo | 137/120 |
| 3,389,962 A | * | 6/1968 | Moorhead et al. | 423/352 |
| 3,671,142 A | * | 6/1972 | Calabrese | 417/36 |
| 3,882,967 A | * | 5/1975 | Gulla et al. | 137/389 |
| 3,981,618 A | * | 9/1976 | Nelson, Jr. | 417/12 |
| 4,037,664 A | * | 7/1977 | Gibson | 169/15 |
| 4,189,005 A | * | 2/1980 | McLoughlin | 169/24 |
| 4,265,262 A | * | 5/1981 | Hotine | 137/2 |
| 4,345,654 A | * | 8/1982 | Carr | 169/24 |
| 4,956,763 A | * | 9/1990 | Stewart et al. | 137/395 |
| 5,195,466 A | * | 3/1993 | Schulte et al. | 123/1 A |
| 5,247,710 A | * | 9/1993 | Carder et al. | 137/392 |
| 5,331,994 A | * | 7/1994 | Bryan et al. | 137/1 |
| 6,026,837 A | * | 2/2000 | Chen | 137/2 |
| 6,588,272 B2 | * | 7/2003 | Mulrooney et al. | 73/324 |
| 2006/0011260 A1 | * | 1/2006 | McLaughlin et al. | 141/94 |

* cited by examiner

*Primary Examiner*—John Rivell
(74) *Attorney, Agent, or Firm*—Haynes and Boone, LLP

(57) ABSTRACT

A water controlling kit is connected to the fluid system, of a fire truck for example, used for pumping water to one or more fire hoses. The kit has a water level gauge, a signaling element and a control valve and is adapted to maintain the pressure at the inlet of the pump of the fire truck within a preselected range of about 1.5 to about 3 psi. during discharge from the pump and pressure fluctuations of the pressurized water supply supplying water to the fire truck reservoir.

9 Claims, 2 Drawing Sheets

US 7,849,871 B2

METHOD AND APPARATUS FOR CONTROLLING A FLUID SYSTEM

CROSS REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

Figure 1:
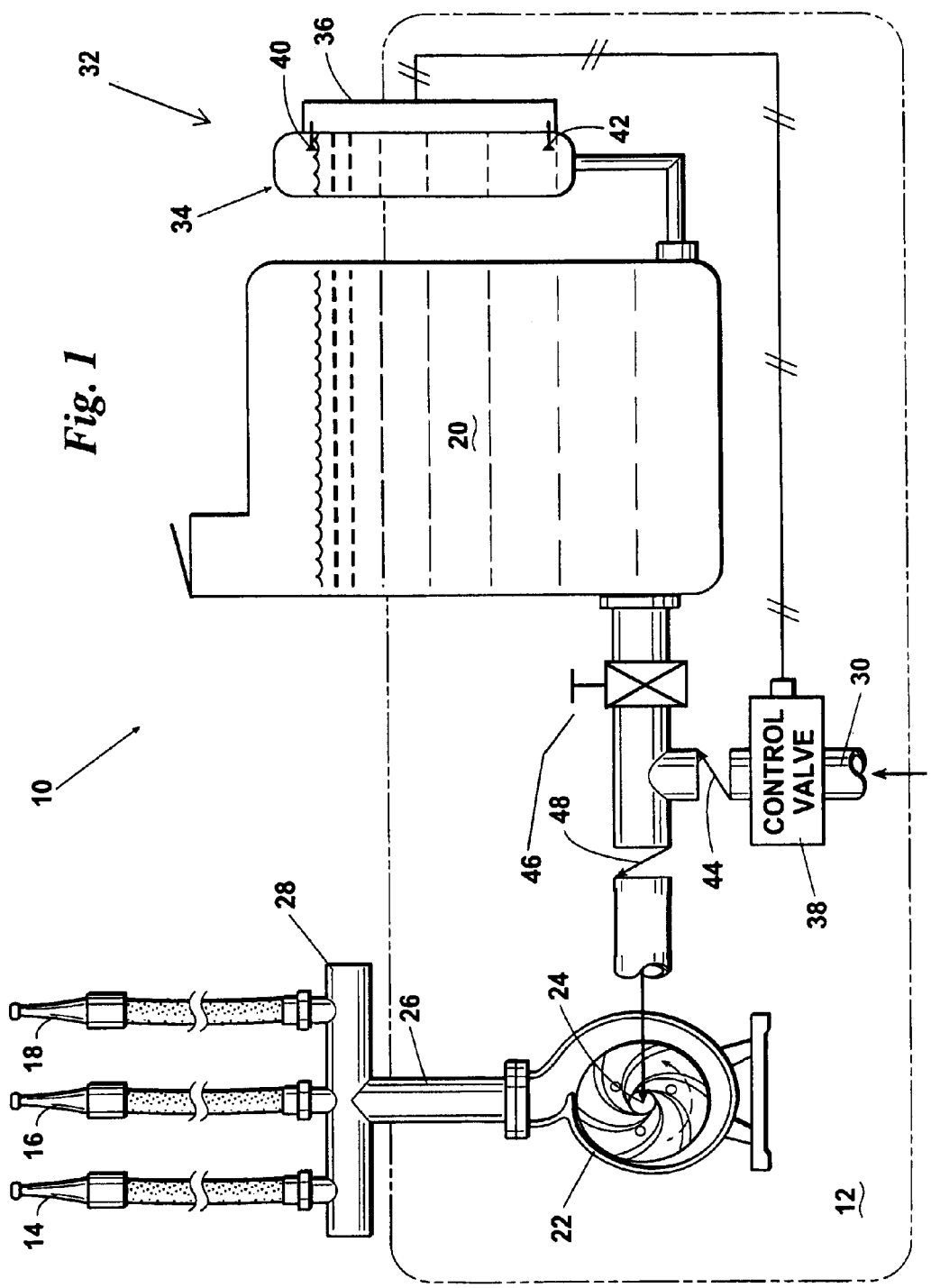

The subject invention relates to a kit for the fluid system used for pumping water, said kit adapted to automatically control the rate of flow of water to the pump in response to pressure fluctuations upstream of the pump.

2. Description of Related Art Including Information Disclosed Under 37 CFR 1.97 and 1.98

This invention relates to the fluid system, of a fire truck for example, used for pumping water to one or more fire hoses. Such fluid systems have a water reservoir connected in fluid communication with a pump, a discharge manifold of the pump and a pressurized water supply source.

Heretofore, when water is supplied from an external pressurized water supply source, the incoming pressure can range between about 1 psi to over about 300 psi. When the incoming pressure varies greatly, it makes it difficult for the pump operator to control the discharge pressure which is delivered to one or more hoses.

The normal desired pressure at each hose is preferably in the range of about 100 to about 200 psi. Excessive hose pressure results in excessive reaction force which generate whipping forces on the hose. Such whipping forces can cause the firemen to lose control of the hose where the hose can then whip around and seriously injure them.

At greatly differing incoming pressure from the pressurized water supply source, the pump operator has a most difficult time of controlling the hose discharge pressure and maintaining a safe condition for the firemen operating the hose.

One present method of controlling the pressure of the pressurized water source to a desired value is by a relief valve in the pressurized water supply source which maintains incoming pressure to the pump by dumping water onto the street. This represents a waste of water and generates a hazard because the area around the truck becomes flooded and in winter can freeze and become even more dangerous.

In another method of controlling the pressure of an incoming water supply source to the pumping truck is by the use of a manually operated valve in the pressurized supply line. Where water supply pressures fluctuate quickly, such systems can be totally ineffective and generate dangerous conditions to the firemen operating the hose.

The present invention is a kit that can be installed on the fluid system of a pumper type fire truck and thereby maintain the incoming pressure at the intake to the pump at a desired value.

The present invention is directed to overcome one or more of the problems, as set forth above.

BRIEF SUMMARY OF THE INVENTION

In one aspect of the invention, a water controlling kit having a water level gauge, a signaling element and a control valve is added to the fluid system of a fire truck used for pumping water to one or more fire hoses. The fluid system has a water reservoir connected in fluid communication with a pump, a discharge manifold, and a pressurized water inlet that is connectable to a pressurized water supply source. The water level gauge has preselected first and second set points and is connectable in fluid communication with the water reservoir. The signaling element is connectable to the water level gauge and is adapted to deliver a first signal in response to the water level being at the first set point and a second signal in response to the water level being at the second set point. The control valve is connectable to the fluid reservoir, the signaling element and the pressurized water inlet and adapted to control the water level in the water reservoir and responsively the water pressure at an inlet of the pump in response to receiving said first and second signals.

In another aspect of the invention, a water controlling kit having a water level gauge, a controlling-signaling element and a control valve is added to the fluid system of a fire truck used for pumping water to one or more fire hoses. The fluid system has a water reservoir connected in fluid communication with a pump, a discharge manifold, and a pressurized water inlet that is connectable to a pressurized water supply source. The water level gauge has a multiplicity of set points and is connectable in fluid communication with the water reservoir. The controlling-signaling element is connectable to the water level gauge and is adapted to receive signals from the set points, determine rates of change of the water level in the water reservoir, and responsively deliver controlling signals to the control valve. The control valve is connectable to the fluid reservoir, the controlling-signaling element and the pressurized water inlet and adapted to operate the control valve and maintain the water level in the tank substantially constant in response to receiving said controlling signals.

In yet another aspect of the invention, a method is provided for controlling the inlet pressure of a pump of a fluid system of a fire truck having the water controlling kit as set forth above. In this method, water is passed from the water reservoir through the pump and from the discharge manifold. The water level in the water reservoir is continuously measured. A first signal is delivered and responsively the control valve is moved toward the closed position in response to the water level in the water reservoir actuating the first set point corresponding to a pump inlet pressure of about 3 psi. A second signal is delivered and responsively the control valve is moved toward the open position in response to the water level in the water reservoir actuating the second set point corresponding to a pump inlet pressure of about 1.5 psi.

In a further aspect of the invention, a method is provided for controlling the inlet pressure of a pump of a fluid system of a fire truck having the water controlling kit as set forth above. In this method, water is passed from the water reservoir through the pump and from the discharge manifold. The water level in the water reservoir is continuously measured. Signals are generated and delivered to the control valve and said control valve is moved in response to the rate of change of water level in the water reservoir and resultingly maintain the water level in the water reservoir substantially constant.

BRIEF DESCRIPTION OF THE SEVERAL VIEWS OF THE DRAWING(S)

Figure 2:
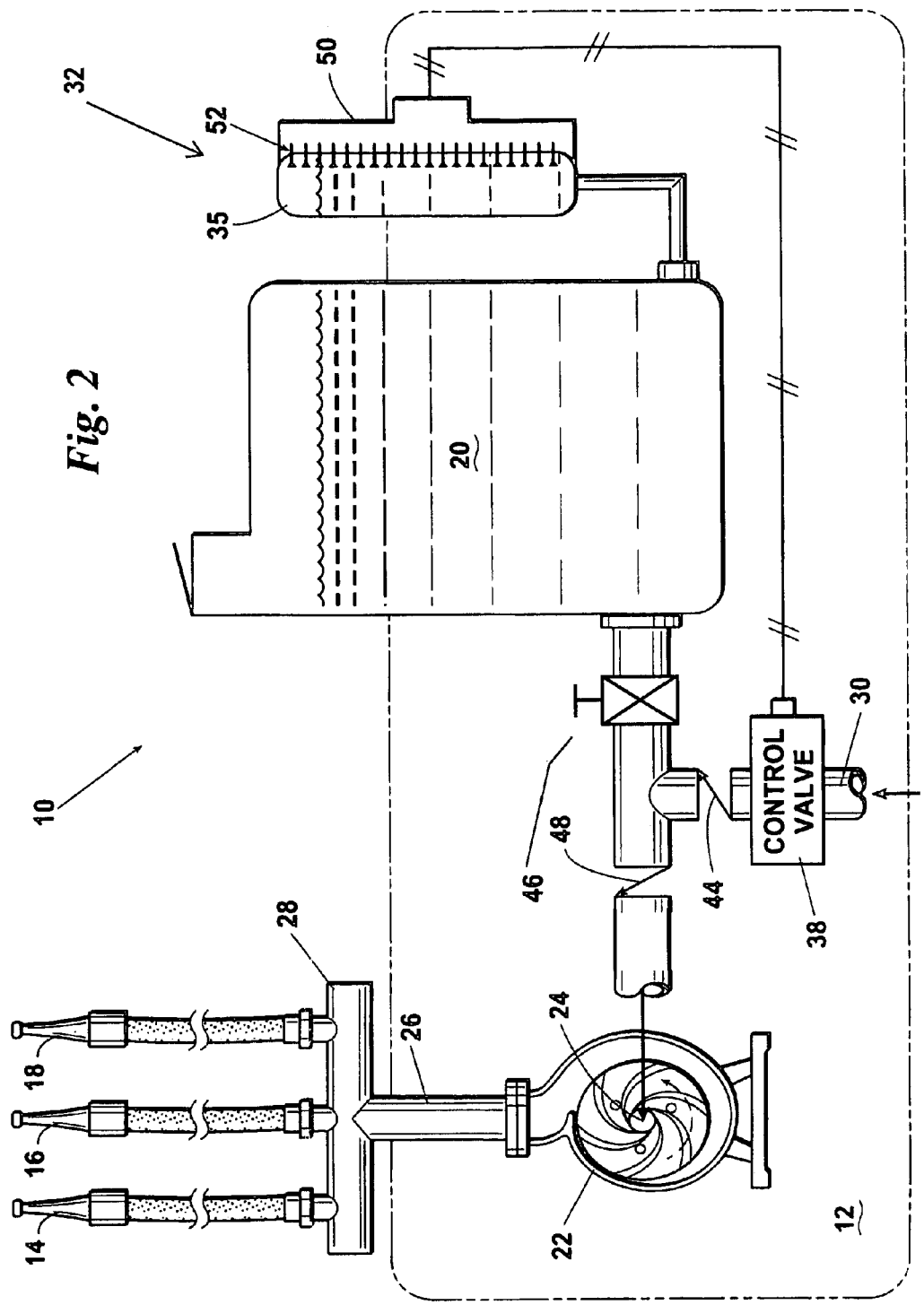

FIG. 1 is a view of the kit of the subject invention and the apparatus on a fluid system to which the kit is connected; and FIG. 2 is a view of a kit of the subject invention of different function and the apparatus on a fluid system to which the kit is connected.

DETAILED DESCRIPTION OF THE INVENTION

Referring to the drawing, a fluid system 10, of a fire truck 12 for example, used for pumping water to one or more fire hoses 14,16,18, has a water reservoir 20 connected in fluid communication with a pump 22. The pump 22 has an inlet 24 and an outlet 26. The outlet of the pump 22 is connected to a discharge manifold 28 which in turn is connected to respective fire hoses 14,16,18. A pressurized water inlet 30 is connected in fluid communication with the water reservoir 20 and the pump inlet 24. The pressurized water inlet 30 is connectable to a water supply source such as a fire hydrant or another pumper truck, as is well known in the art.

A water controlling kit 32 of this invention comprises a water level gauge 34, a signaling element 36 and a control valve 38.

The water level gauge 34 has preselected first and second set points 40, 42. The water level gauge 34 is connectable in fluid communication with the water reservoir 20. The signaling element 36 is connectable to the water level gauge and is adapted to deliver a first signal in response to the water level in the water reservoir 20 being at the first set point 40 and a second signal in response to the water level being at the second set point 42. The control valve 38 is connectable in communication with the fluid reservoir 20 and the pressurized water inlet 30 and is connectable to the signaling element 36. The control valve 38 is adapted to control the water level in the water reservoir 20 and resultingly the water pressure at the inlet 24 of the pump 22 in response to receiving said first and second signals.

The set points 40,42 of the water level gauge 34 are adapted to maintain a pressure at the inlet 24 of the pump 22 in the range of about 1.5 to about 3 psi. As is known in the art, 1.5 psi pressure at the pump inlet is represented by a head of fluid in the reservoir 20 of about 41 inches and 3 psi pressure at the pump inlet is represented by a head of fluid in the reservoir 20 of about 84 inches.

Referring to FIG. 2, the water controlling kit 32 has a water level gauge 35 which has an multiplicity of set points 52 and is connectable to a controlling-sensing element 50. The controlling-sensing element 50 receives water level signals from the water level gauge 35, determines the rates of change of the water level in the water reservoir 20 and responsively delivers controlling signals to the control valve 38. The controlling signals operate the control valve 38 and maintain the water level in the water reservoir 20 substantially constant.

In order to prevent flow from the reservoir 20 toward the water supply source, an optional check valve 44 may be positioned in the pressurized water inlet 30 between the water reservoir 20 and the control valve 38. This check valve would be actuated for example in response to loss of water pressure from the pressurized water source. Likewise, a master valve 46 and an optional check valve 48 are positioned between the pump and the water reservoir 20. The second check valve 48 prevents back flow of fluid through the pump 22 and into the reservoir 20 and the master valve 46 is used to close the system and prevent draining of the water reservoir 20 when the system is not in use.

As water is passed from the water reservoir 20 through the pump 22 and from the discharge manifold 28, the water level in the water reservoir is continuously measured. A first signal is delivered from the water level gage 34 and associated signaling element 36 and responsively moves the control valve 38 toward the closed position in response to the water level in the water reservoir 20 actuating the first set point corresponding to a pump inlet pressure of about 3 psi. A second signal is delivered from the water level gage 34 and associated signaling element 36 and responsively moves the control valve 38 toward the open position in response to the water level in the water reservoir 20 actuating the second set point corresponding to a pump inlet pressure of about 1.5 psi.

By so opening, closing and regulating access of the pressurized water supply to the reservoir 20 the water level within the reservoir 20 can be maintained and thereby maintain the pressure at the inlet 24 of the pump 22 within a preselected range during discharge from the pump and pressure fluctuations of the pressurized water supply.

Other aspects, objects and advantages of this invention can be obtained from a study of the drawing, the disclosure and the appended claims.

The invention claimed is:

1. A system for pumping fluids, comprising:
a pressurized fluid supply source;
a fluid reservoir;
a discharge manifold;
a pump disposed between, and in fluid communication with, the fluid reservoir and the discharge manifold, the pump adapted to receive fluid at a pressure; and
a control system for maintaining the pressure of the fluid received by the pump at a substantially constant value, the control system comprising:
a fluid level gauge, in fluid communication with the fluid reservoir, the fluid level gauge having a multiplicity of set points;
a signaling element operably coupled to the fluid level gauge, the signaling element:
receiving signals from the set points,
determining rates of change of the fluid level in the fluid reservoir, and delivering controlling signals in response to the determined rates of change; and
a control valve, in fluid communication with the fluid reservoir and the pressurized fluid supply source, and operably coupled to the signaling element, the control valve responding to the controlling signals from the signaling element to maintain the level of the fluid in the fluid reservoir at a substantially constant level, so that the pressure of the fluid received by the pump is maintained at the substantially constant value.

2. The system of claim 1,
wherein the multiplicity of set points includes preselected first and second set points that are different, wherein the first set point is specifically preselected to correspond to a pressure of substantially 3.0 psi at an inlet of the pump and the second set point is specifically preselected to correspond to a pressure of substantially 1.5 psi at the inlet of the pump, the substantially constant value being between 1.5 psi and 3.0 psi;
wherein the signaling element further delivers the controlling signals in response to the fluid level being at the first set point and in response to the fluid level being at the second set point; and wherein in response to the controlling signals said control valve controls the fluid level in the fluid reservoir so as to maintain the fluid pressure at the inlet of the pump between 1.5 psi and 3.0 psi.

3. The system, as set forth in claim 1, including a master valve positioned between the pump and the fluid reservoir.

4. A method for controlling the fluid system of claim 2, comprising:
   passing fluid from the fluid reservoir through the pump and from the discharge manifold;
   continuously measuring the fluid level in the fluid reservoir;
   moving the control valve toward a closed position in response to the fluid level in the fluid reservoir actuating the first set point corresponding to a pump inlet pressure of substantially 3 psi; and
   moving the control valve toward an open position in response to the fluid level in the fluid reservoir actuating the second set point corresponding to a pump inlet pressure of substantially 1.5 psi.

5. In the fluid system of a fire truck used for pumping water to one or more fire hoses, said fluid system having a water reservoir connected in fluid communication with a pump, a discharge manifold, and a pressurized water inlet that is connectable to a pressurized water supply source, the improvement comprising:
   the pump disposed between the water reservoir and the discharge manifold and adapted to pump water from the water reservoir to the discharge manifold;
   a water controlling kit having a water level gauge, a controlling-signaling element, and a control valve;
   said water level gauge having a multiplicity of set points and being connectable in fluid communication with the water reservoir;
   said controlling-signaling element being connectable to the water level gauge and being adapted to receive signals from the set points, determine rates of change of the water level in the water reservoir, and deliver controlling signals in response to the determined rates of change; and
   said control valve being connectable in communication with the water reservoir, the controlling-signaling element, and the pressurized water inlet and being adapted to operate the control valve and maintain the water level in the water reservoir substantially constant in response to receiving said controlling signals so that the pressure of the water received by the pump is maintained at a substantially constant value.

6. A method for controlling the fluid system of claim 5, comprising:
   passing water from the water reservoir through the pump and from the discharge manifold;
   continuously measuring the water level in the water reservoir; and
   delivering signals and responsively moving the control valve in response to the rate of change of the water level in the water reservoir and thereby maintaining the water level in the water reservoir substantially constant.

7. A system for pumping fluids from a pressurized fluid supply source, the system having a pump disposed between, and in fluid communication with, a fluid reservoir and a discharge manifold, the pump adapted to receive fluid at a pressure, the system further comprising:
   a control system for maintaining the pressure of the fluid received by the pump at a substantially constant value, the control system comprising:
      a fluid level gauge, in fluid communication with the fluid reservoir, the fluid level gauge having a multiplicity of set points;
      a signaling element operably coupled to the fluid level gauge, the signaling element:
         receiving signals from the set points,
         determining rates of change of the fluid level in the fluid reservoir, and
         delivering controlling signals in response to the determined rates of change;
      and
      a control valve, in fluid communication with the fluid reservoir and the pressurized fluid supply source, and operably coupled to the signaling element, the control valve responding to the controlling signals from the signaling element to maintain the level of the fluid in the fluid reservoir at a substantially constant level, so that the pressure of the fluid received by the pump is maintained at the substantially constant value.

8. The system of claim 7,
   wherein the control system maintains the pressure of the fluid received by the pump within a range between a pressure of substantially 1.5 psi and a pressure of substantially 3.0 psi, the substantially constant value being between 1.5 psi and 3.0 psi;
   wherein the multiplicity of set points includes a first preselected set point corresponding to a first fluid level in the fluid reservoir and a second preselected set point corresponding to a second fluid level in the fluid reservoir, wherein the first set point is specifically preselected to correspond to the pressure of substantially 1.5 psi at an inlet of the pump, and the second set point is specifically preselected to correspond to the pressure of substantially 3.0 psi at the inlet of the pump;
   wherein the signaling element further delivers the controlling signals in response to the fluid level in the fluid reservoir being at the first set point and in response to the fluid level in the fluid reservoir being at the second set point; and
   wherein in response to the controlling signals the control valve moves toward:
      an open position in response to the fluid level in the fluid reservoir being at the first set point, and
      a closed position in response to the fluid level in the fluid reservoir being at the second set point,
   so that the pressure of the fluid received by the inlet of the pump is maintained within the range of substantially 1.5 psi to substantially 3.0 psi.

9. The system of claim 7, further comprising a master valve positioned between the pump and the fluid reservoir.

* * * * *